UNITED STATES PATENT OFFICE.

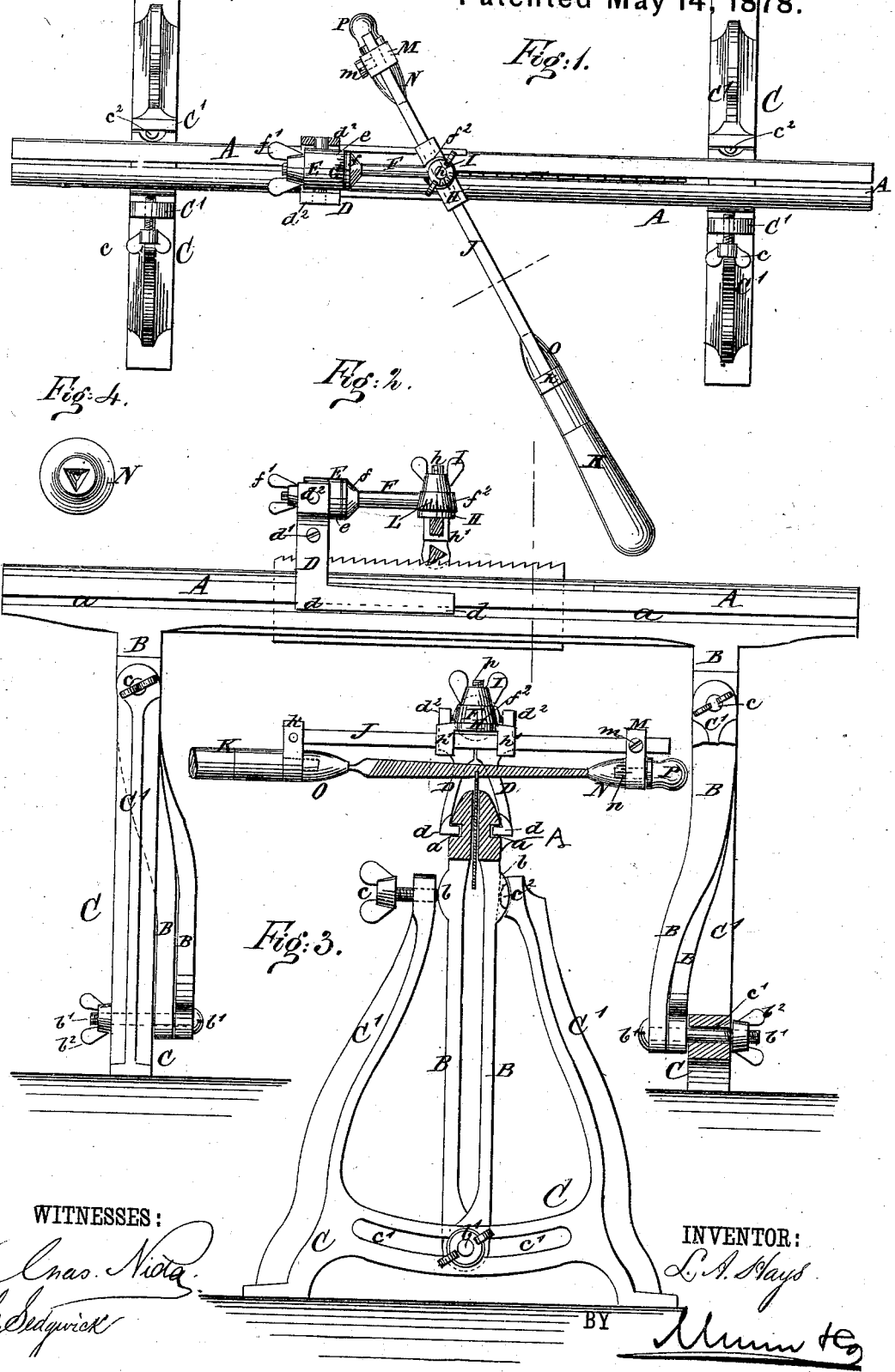

LAFAYETTE A. HAYS, OF GREENVILLE, NEW HAMPSHIRE.

IMPROVEMENT IN SAW-FILING MACHINES.

Specification forming part of Letters Patent No. 203,616, dated May 14, 1878; application filed April 17, 1878.

*To all whom it may concern:*

Be it known that I, LAFAYETTE A. HAYS, of Greenville, in the county of Hillsborough and State of New Hampshire, have invented a new and Improved Saw-Filing Apparatus, of which the following is a specification:

The object of my invention is to provide an adjustable saw-clamp, file-holder, and file-guide for holding saw-blades and uniformly filing the teeth of the same at any angle desired, horizontal or vertical.

The invention consists in the construction and combination of the various parts, as will be hereinafter described and claimed.

In the accompanying drawing, Figure 1 represents a top view of my improved saw-filing apparatus. Fig. 2 is a side elevation of the same. Fig. 3 is a vertical cross-section of the same, taken on the line $x$ $x$ of Fig. 2. Fig. 4 is an end view of the file-point socket.

Similar letters of reference indicate corresponding parts.

A are the jaws, and B the shanks or arms of the saw-clamp, which is supported between the uprights C' of the end frames C, and adjustable as to lateral inclination. This is accomplished by providing the clamp with curved projections $b$ on the arms B, one of which projections fits in a similarly curved cavity in the upper end of one of the uprights C', the opposite projection $b$ being acted upon by the set-screw $c$ to close the jaws A and clamp the saw-blade; and by pivoting together the lower ends of the arms B by a threaded bolt, $b^1$, which is inserted through a slot, $c^1$, in the frame C, and secured in any desired position by a thumb-nut, $b^2$, on the bolt $b^1$, tightened against the outside of the frame C, the pair of arms B held in each end frame C being bent so as to adapt them to rest against the inside of the frame C, opposite to the nut $b^2$.

The slot $c^1$ is curved to the center of oscillation, which lies between, and is also the center of, the curves of the projections $b$.

To prevent the upper end of the frame C from sliding off sidewise from the projections $b$ of the arms B, a catch, $c^2$, is formed upon one of the uprights C' of each frame C, on the concave surface in which the corresponding convex projection $b$ works, said catch $c^2$ entering a corresponding notch in the projection $b$.

The jaws A of the saw-clamp are grooved along their outer sides, the said grooves $a$ serving to receive and guide the flanges $d$ of the sliding bracket D, which latter is made in two parts, clamped together by a screw, $d^1$, and arranged to straddle the jaws A of the saw-clamp.

Above the jaws A the two parts of the bracket D end with vertical lugs $d^2$, between and to which is pivoted a block, E, having a hole through it at right angles to its pivoting-line for the reception of the file-holding rod F. This is threaded on the end by which it enters the hole in the block E, and is provided with a surrounding flange, $f$, faced to fit against the hub $e$ on the block E, and is held firmly in the said block by tightening the nut $f^1$ against that side of the block E which is opposite to that in contact with the flange $f$.

The degree of turning the rod F in the block E before tightening the nut $f^1$ is observed by the juxtaposition of one or other of a number of division-lines, G, on the flange $f$ to a mark made on the hub $e$ of the block E, or vice versa.

The free end of the rod F has an eye, $f^2$, in which is fastened, by a thumb-nut, I, the vertical-threaded pin $h$ of the horizontal bracket H, which latter has two downward-projecting lugs, $h^1$, provided with square holes, through which is fitted to slide the square slide-bar J of the file-handle K.

The degree of turning the bracket H upon its pin $h$ in the eye $f^2$ is observed by the juxtaposition of one or other of a number of division-lines, L, upon the metal of the eye $f$ to a mark upon the bracket H.

The slide-bar J is secured to the handle K by a bracket, $k$, at one end. A similar bracket, M, provided with a square hole to make it fit and be slid on the square bar J, is secured at the other end to the said bar J by the set-screw $m$.

The brackets K M extend far enough below the bar J to support the file-holding handle K and socket-blocks N O in such position that the file, when inserted, will slide clear of the lugs $h'$ of the sliding rod-bracket H.

The block O has a round socket for the reception of the tongue of the file, and the block N has a three-cornered socket for the reception of the point of the file. The socket-blocks O N have each a threaded shank, by which they are arranged to be turned in holes in the brackets K M, and tightened to the same respectively by the handle K and the knob P, which are threaded to fit the said shanks and act as thumb-nuts on the same.

The inclination of the file, or the degree of turning it on its axis to give the proper hook to the teeth, may be gaged by the division-marks $n$ on the socket-block N, in juxtaposition to a fixed mark on the bracket M.

The swinging arm and block F E allow the file to descend enough to cut any depth of teeth to which the saw-blade has been gaged in the jaws A of the saw-clamp.

By the vertical pin or pivot $h$ the file can be turned horizontally into the position shown in Fig. 1, and secured to work at any desired angle to the saw-blade by tightening the thumb-nut I.

By turning the rod F in the block E the file may be inclined vertically at any desired angle, and fastened in position by the thumb-nut $f^1$.

Held in whatever position, the file is always guided in a rectilinear motion when in use.

By changing the position of the bolt $b^1$ of the clamp-shanks B in the slot $c'$ of the frame C, the saw-blade itself may be inclined to suit the convenience of the workman, and held in the inclined position by tightening the nut $b^2$.

Having thus described my invention, I claim as new and desire to secure by Letters Patent—

1. The saw-clamp A B, provided with the convex projections $b$, and compressed between the uprights $C'$ of the end frames C by the set-screws $c$, in combination with the slotted frames C and the bolt and thumb-nut $b^1 b^2$, for adjusting the inclination of the saw-blade, substantially as specified.

2. The combination of the slotted jaws A, the sliding bracket D, the pivoted block E, the flanged eyebolt or rod F, and the thumb-nut $f^1$, to allow of downward movement of the file and adjust its vertical inclination, substantially as specified.

3. The pivoted guide-bracket H, in combination with the sliding bar J of the file-holder, the eyebolt F, and the thumb-nut I, to adjust the horizontal inclination and insure the rectilinear movement of the file, substantially as specified.

4. The combination, with the bracket $k$, stationary upon the bar J, and the bracket M, adjustable upon the bar J, of the socketed blocks O N, fitted to turn in the said brackets and secured by the handle and knob K P, for the purpose of holding the file and turning it upon its axis, substantially as specified.

5. A saw-filing machine consisting in the combination of the end frames C, the saw-clamp A B, the sliding bracket D, the pivoted block E, eyebolt F and guide-bracket H, the slide-bar J, brackets K M, socket-blocks O N, handle K, and knob P, all constructed, connected, and operating substantially as and for the purposes specified.

LAFAYETTE A. HAYS.

Witnesses:
CHARLES E. HALL,
DAVID E. BLOOD.